(12) United States Patent
Tiffany et al.

(10) Patent No.: US 8,029,839 B2
(45) Date of Patent: Oct. 4, 2011

(54) PROCESSING METHOD FOR MICROWAVABLE FRENCH FRIES

(75) Inventors: Linda E. Tiffany, Ontario, OR (US); Patricia A. Mason, Fruitland, ID (US); Gary Neff, Pittsburgh, PA (US)

(73) Assignee: ProMark Brands, Inc., Meridian, ID (US)

( * ) Notice: Subject to any disclaimer, the term of this patent is extended or adjusted under 35 U.S.C. 154(b) by 968 days.

(21) Appl. No.: 11/504,807

(22) Filed: Aug. 16, 2006

(65) Prior Publication Data

US 2006/0286225 A1 Dec. 21, 2006

Related U.S. Application Data

(62) Division of application No. 10/642,347, filed on Aug. 18, 2003, now Pat. No. 7,108,878.

(51) Int. Cl.
*A23L 3/00* (2006.01)
(52) U.S. Cl. ........ 426/234; 426/107; 426/243; 219/730; 219/732
(58) Field of Classification Search .............. 219/730, 219/732; 426/107, 234, 243
See application file for complete search history.

(56) References Cited

U.S. PATENT DOCUMENTS

| 4,198,437 A | 4/1980 | Citti et al. |
| 4,219,575 A | 8/1980 | Saunders et al. |
| 4,931,296 A | 6/1990 | Shanbhag et al. |
| 4,935,592 A * | 6/1990 | Oppenheimer ............... 219/730 |
| 5,000,970 A | 3/1991 | Shanbhag et al. |
| 5,004,616 A | 4/1991 | Shanbhag et al. |
| 5,049,710 A * | 9/1991 | Prosise et al. ................. 219/730 |
| 5,096,723 A | 3/1992 | Turpin |
| 5,175,404 A | 12/1992 | Andreas et al. |
| 5,310,977 A | 5/1994 | Stenkamp et al. |
| 5,997,938 A | 12/1999 | Taylor et al. |
| 6,781,101 B1 * | 8/2004 | Hoese et al. .................. 219/730 |

* cited by examiner

*Primary Examiner* — Rena Dye
*Assistant Examiner* — Chaim Smith
(74) *Attorney, Agent, or Firm* — Buchanan, Ingersoll & Rooney PC (57) ABSTRACT

A microwavable crinkle-cut French fry potato includes deep groves and coatings of oil and encapsulated salt. Crinkle-cut potato pieces are prepared with a solids content of 40-50% by weight, frozen, sprayed with oil and coated with encapsulated salt. A carton for the potato pieces is formed from a single-piece blank provided with a pair of microwave susceptor surfaces and reinforced corners. A removable lid contacts the potato pieces during microwave reconstitute.

4 Claims, 7 Drawing Sheets

PROCESSING METHOD FOR MICROWAVABLE FRENCH FRIES

RELATED APPLICATIONS

This application is a divisional of application Ser. No. 10/642,347 now U.S. Pat. No. 7,108,878, filed Aug. 18, 2003.

FIELD OF THE INVENTION

This invention generally concerns potato pieces that can be reconstituted through use of microwave energy as well a microwave interactive package therefor. More particularly, the invention concerns crinkle-cut French fry potato pieces specially processed so as to be uniquely adapted for reconstitution with microwave energy. Further, the invention concerns a special carton have microwave susceptor inserts which contact the potato pieces while restricting steam egress.

DESCRIPTION OF THE RELATED ART

Processing of potatoes for reconstitution by consumers and institutions as French fries has been known for many years. Likewise, various forms of packaging for such French fries has also been known for a long time. Also, reconstitution of frozen French fries by baking, deep frying in oil, exposure to microwave radiation, and other heating processes are also known.

According to U.S. Pat. No. 5,310,977 issued to Stenkamp et al., Ore-Ida® has used a paperboard box measuring 5.375 inches by 4 inches by 1.375 inches to package crinkle-cut potatoes. Stenkamp et al. proposed the use of microwave susceptor material placed between layers of crinkle-cut French fries, where the microwave susceptor material has been configured with angular pleats, sinusoidal undulations, or an array of pyramids. Such arrangements complicate the packaging process as they require careful layering of the product and the microwave susceptor materials.

According to U.S. Pat. No. 4,931,296 issued to Shanbhag et al., potato granule coated French fries are known, which may be crinkle-cut, where finely ground salt is applied at a concentration of 0.5 to 1.5% by weight to provide an acceptable taste. Shanbhag et al. hypothesize that their thin coating on the potato strip forms inhibits steam generated in the potato during heating from escaping during finish frying so that an invisible gap is formed between the coating and the product interior.

In U.S. Pat. No. 4,935,592, Oppenheimer discloses a microwave cooking container for browning potato products. The container includes a microwave susceptor insert having a plurality of longitudinal slots sized and arranged to receive individual French fry potato pieces.

U.S. Pat. No. 5,000,970 issued to Shanbhag et al. concerns a process for preparing reheatable French fried potatoes. After finish frying, the potato strips are sprinkled with finely ground salt in an amount of 0.25 to about 1.0 percent by weight. Specifically, fat-encapsulated salt granules may be used.

U.S. Pat. No. 5,049,710 issued to Prosise et al. discloses a package for food items such as French fried potato strips that are uniform in size and shape. The package is arranged such that each of three layers of food items contact microwave susceptor material on two opposite sides. The package includes vent panels that are open during microwave heating of the food items. Another vented microwave heating package for elongated food products, such as French fries, is disclosed by U.S. Pat. No. 5,096,723 issued to Turpin. The Turpin package has an internal tray component. Further, U.S. Pat. No. 5,175,404 issued to Andreas et al. discloses a vented package having microwave receptive heating sheets arranged so that individual elongated food sticks are heated on at least three sides.

The known packages for microwavable French fries generally require special arrangements of the potato pieces. For example, the containers discussed above require that the potato pieces be aligned parallel with one another in susceptor packages to have the necessary contact with microwave susceptor surfaces. In processing of French fried potatoes, and in the packaging thereof, the potato pieces are normally randomly oriented. Thus, those packaging arrangements necessitating special orientation of the potato pieces also require additional handling equipment which adds processing expense.

BACKGROUND OF THE INVENTION

There continues to be a need in the industry for a microwavable French fry potato product that exhibits a uniformly crisp surface texture, a uniformly moist tender interior texture, and a flavor comparable to restaurant fries after reconstitution by microwave heating. Known processes for making French fry potato pieces have not satisfied that need as shown, for example, by the prior art patents discussed above.

Moreover, there continues to be a need in the industry for a packaging system that accepts French fried potato pieces with a random orientation for storage, sale, and ultimate reconstitution by the consumer.

SUMMARY OF THE INVENTION

In accord with one broad aspect of the invention, a crinkle-cut French fried potato piece includes longitudinal surfaces having rounded peaks separated by rounded grooves where the depth of the grooves is about 50% greater than the depth of conventional crinkle-cut French fried potato pieces. Preferably, the deeper grooves have a depth selected so that at least about 50% of the volume of the potato piece includes the ridge portion of the crinkle-cut French fries, whereas less than 50% of the volume of the potato piece occupies the solid core of the crinkle-cut potato piece.

Consistent with another broad aspect of the invention, a process for preparing potato pieces for microwave reconstitution includes making potato pieces having a relatively high total solid content, coating frozen potato pieces with soybean oil, and applying encapsulated salt. Use of encapsulated salt enhances the microwave reconstitution of the potato pieces since encapsulation maintains integrity of the salt so that it can function as a dielectric during the microwave heating process.

Another broad aspect of the invention concerns a specialized package adapted to receive randomly position French fry potato pieces. The package includes microwave susceptor material positioned on the inside of the two major surfaces. In use, one major surface of the package is removed, the potato pieces are aligned so as to be one layer thick, the lid is pressed into contact with the potato pieces, and the prepared package subjected to microwave heating.

Other more detailed aspects of the crinkle-cut potato pieces, the process for preparing those pieces, the package, as well as the process of reconstituting French fried potatoes using that package are described in more detail in the specification below.

BRIEF DESCRIPTION OF THE DRAWINGS FIGURES

Many objects and advantages of this invention will be apparent to those skilled in the art when this specification is read in conjunction with the attached drawings wherein like reference numerals have been applied to like elements and wherein.

DETAILED DESCRIPTION OF THE INVENTION

Figure 1:
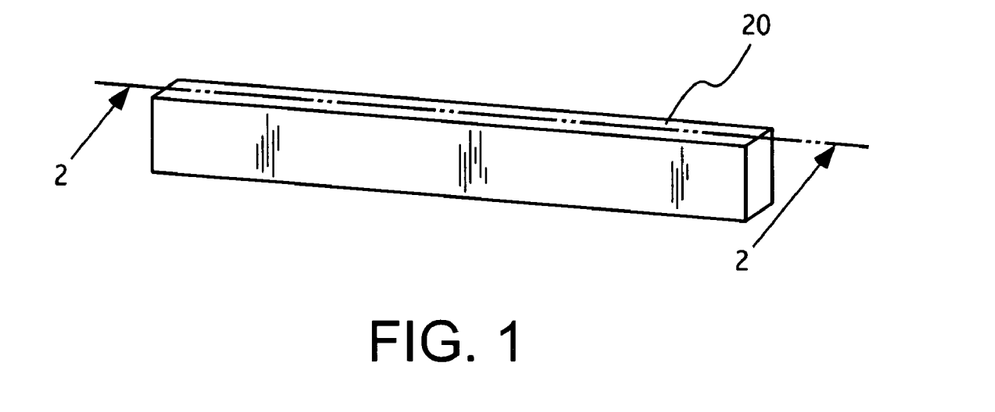
FIG. 1 is a perspective view of a typical elongated potato piece.

Turning to FIG. 1, an elongated potato piece 20 in accord with this invention is generally illustrated. The potato piece is generally elongated and generally square in cross section. Typical cross-sectional dimensions of the finished potato piece are ⅜ inch by ⅜ inch to ½ inch by ½ inch. Those typical dimensions of the finished piece are, however, somewhat smaller that the typical dimensions of the raw, pre-processing, potato piece. For example, the finished potato piece may by ½ inch by ½ inch while the same potato piece started with 9/16 inch by 9/16 inch dimensions when raw. The length of a typical potato piece lies in the range of 1½ to 5 inches. Potato pieces with these typical dimensions are known as French fries.

While the surface of the potato pieces may be generally smooth as illustrated in FIG. 1, the surface may have any other known configuration. The preferred configuration for microwavable French fries according to this invention, however, is commonly known as crinkle-cut. For example, in FIG. 2, the longitudinally extending surfaces 22, 24 of the potato piece have undulations which may be smooth as illustrated. The undulations of each surface define a plurality of peaks 26, with each adjacent pair of peaks 26 being separated by groove 28. The peak-to-peak distance, p, between crests of the undulations preferably remains constant. On the actual surface of the crinkle-cut French fry, those peaks 26 are ridges that extend transversely to the longitudinal axis of the French fry potato piece. Ideally, those ridges are perpendicular to the longitudinal axis of the French fry, but during the cutting process, the ridges do not always form in a perpendicular relationship to that axis. Accordingly, due to the manner the crinkle-cut surfaces are formed, the grooves and crests on any given surface, while parallel to one another, may extend at an angle other than 90° to the longitudinal axis.

Figure 2:
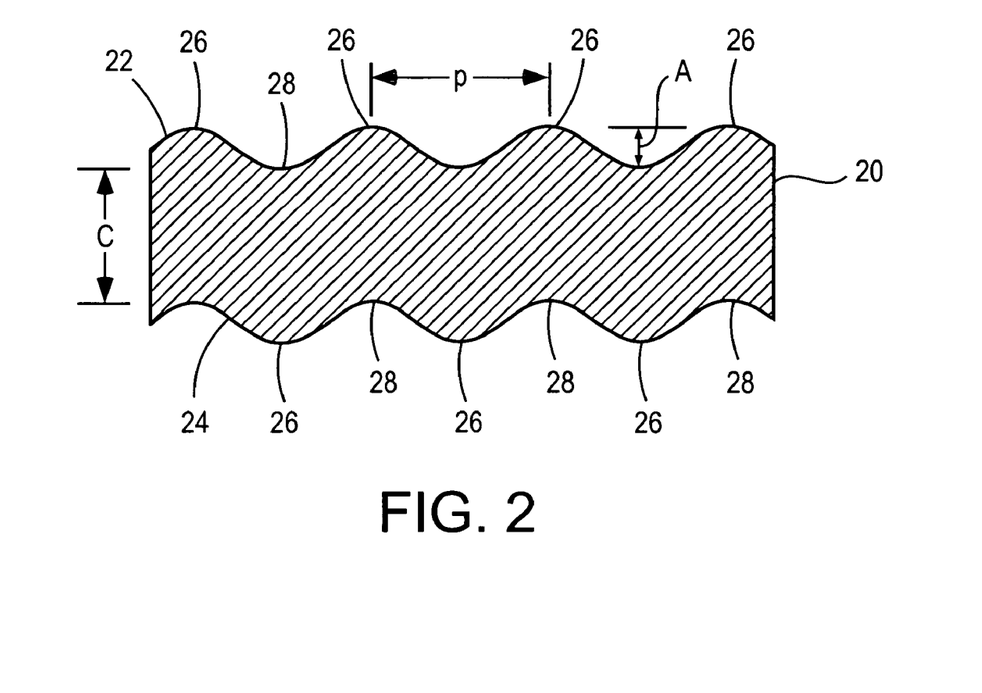
FIG. 2 is an enlarged, partial cross-sectional view taken along the line 2-2 of FIG. 1.

To further define the surface of the crinkle-cut French fry potato pieces, that peak-to-peak distance, p, or the ridge-to-ridge distance, is measured perpendicularly to the parallelly extending ridges. Moreover, the grooves 28 between the ridges 26, are parallel to the ridges 26 and extend transversely to the longitudinal axis of the potato piece.

As seen in FIG. 2, the grooves between adjacent ridges of the crinkle-cut potato piece have a depth, A. The crinkle-cut potato piece thus has ridges 26 on each side and a solid core, c, which is not penetrated by the grooves 28. The depth, A, of the grooves 28 is the same as the height of the ridges and is a very important feature of the present invention. More particularly, the depth, A, of the grooves is selected to be about 50% greater than the corresponding depth of conventional crinkle-cut potato pieces. In the past, the depth of the grooves was typically about 1/16 inch. However, according to this invention, the depth, A, of the grooves is in the range of 0.08 to 0.11 inches, preferably about 0.094 or 3/32 inch.

The curved features of the grooves and the ridges, when viewed in cross section, is another important feature of the invention. More specifically, the curved or rounded shape of the bottom of the grooves 26 exposes more of the core of the potato piece to processing. That is, the distance to the surface of the potato piece is shorter with the deeper, curved grooves than in prior known potato pieces. That distance has important effects on process steps used to prepare potato pieces for microwave reconstitution.

Figure 3:
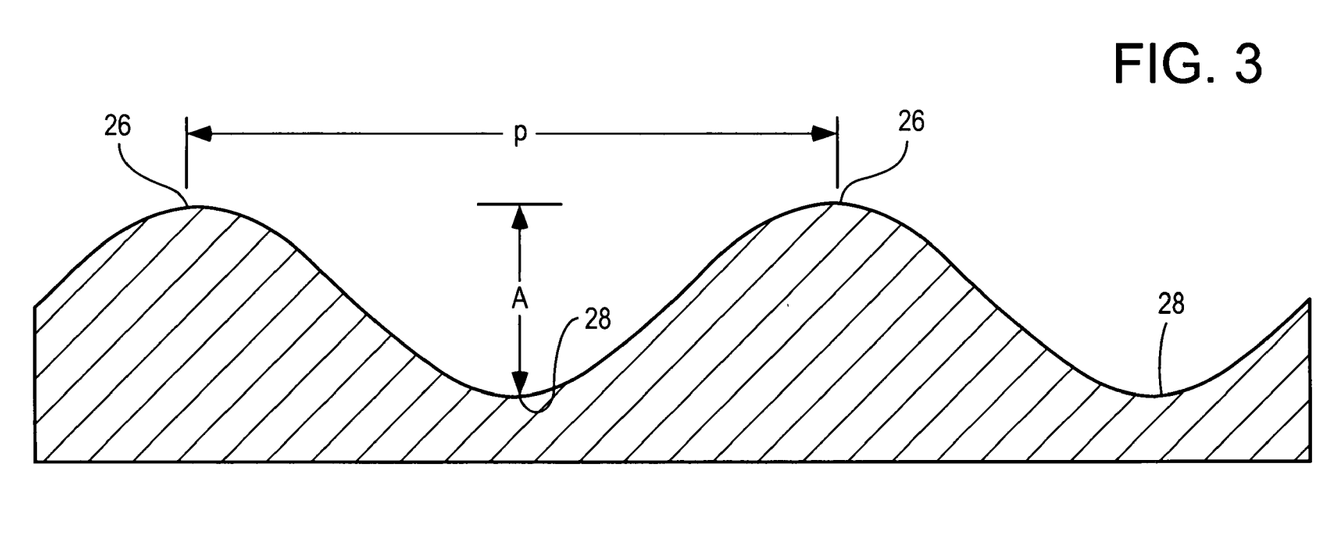
FIG. 3 is a further enlarged, cross-sectional view of a portion of the surface of the potato of FIG. 2.
Figure 4:
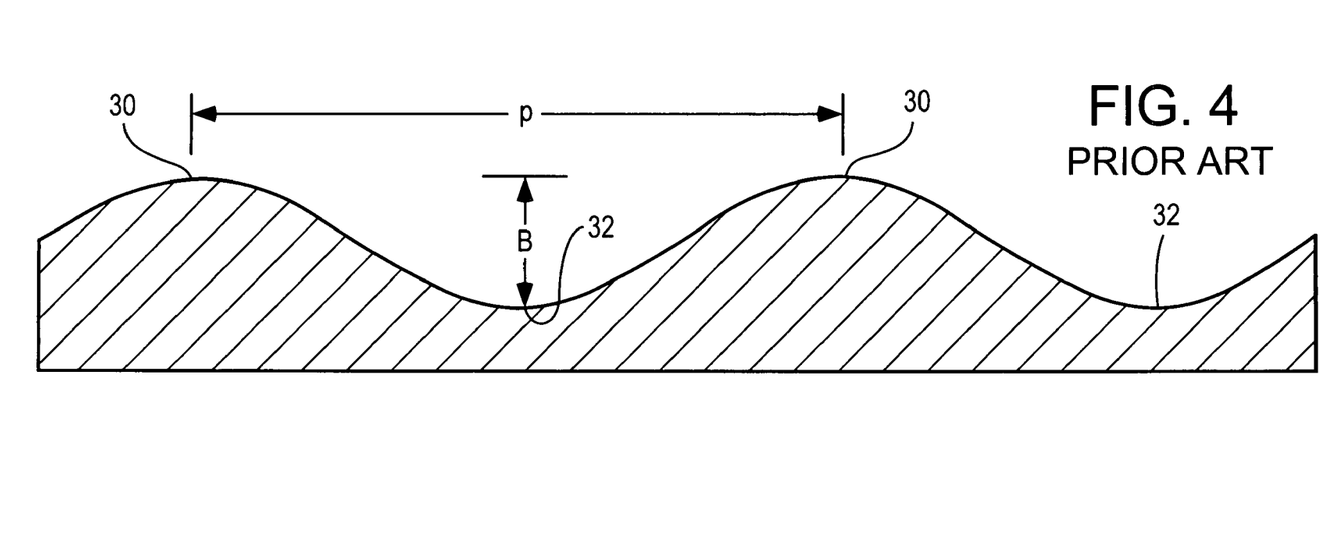
FIG. 4 is an enlarged, cross-sectional view of a corresponding portion of the surface of a prior art potato piece.

FIGS. 3-4 illustrate the differences between crinkle-cut potato pieces of this invention and the prior art. FIG. 3 is a further enlarged cross section of a potato piece, similar to the view of FIG. 2. FIG. 4, is an enlarged view of a prior art crinkle-cut potato piece, with the same scale as FIG. 3. In FIG. 4, the depth, B, of the grooves 32 was typically about 1/16 inch for commercial potato pieces. Another prior art surface treatment (not illustrated) is known in the art as a concertina cut and is characterized by peaks separated by deep grooves, where the peaks on one side of the potato piece are directly opposite corresponding peaks on the opposite side of the potato piece. In that respect, the concertina cut is different from the crinkle-cut because the peaks on one side of the crinkle-cut potato piece are directly opposite corresponding grooves on the opposite side of the potato piece.

In accord with the present invention, the depth, A, of the groove is selected to be about 50% larger than the depth, B, of the prior art crinkle-cut potato piece. In the context of a ½ by ½ inch French fried potato piece, that 1/16 inch depth, B, resulted in 60% of the potato piece being in the core region while about 40% of the potato piece was in the ridges. With the deeper grooves of the present invention (i.e., with the depth, A), the ridges contain 49-63% of the potato-piece volume, whereas the solid core contains 37-51% of the potato-piece volume. After processing and reconstitution by microwave heating, it has been determined that the deeper grooves (or higher ridges) of the present invention give the fries more surface area where the solids of the potato are concentrated and this higher surface area will deliver a crisp exterior and while the smaller core of the fry provides the moist potato interior characteristic of a deep-fried French fry.

Figure 5:
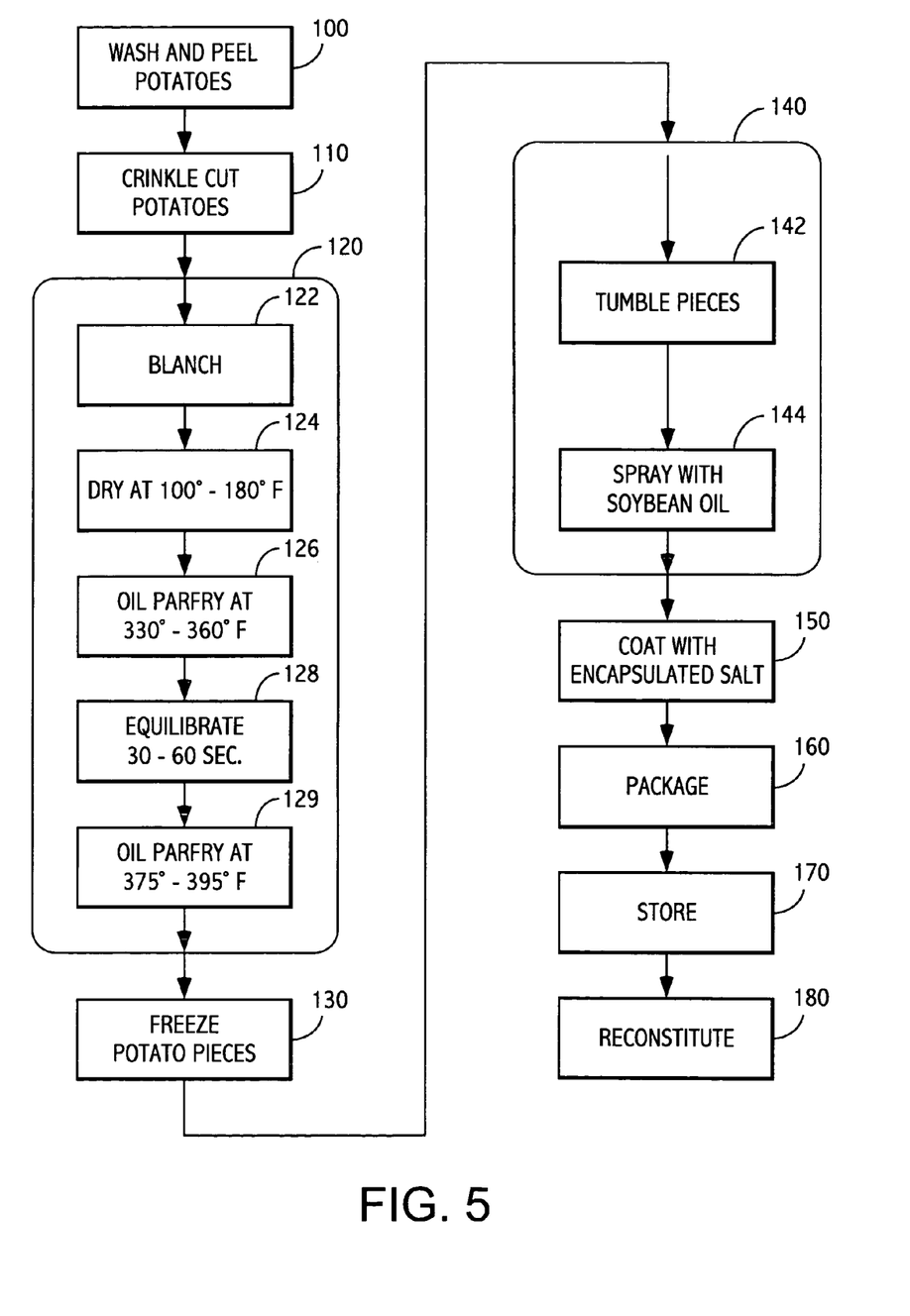
FIG. 5 is a flow diagram of the process steps involved in making a microwavable potato piece according to this invention.

We turn now to the process for preparing the potato pieces, see FIG. 5. Initially, the potatoes are washed and peeled, 100, using standard conventional processing procedures. Next, the potatoes are cut into elongated pieces, 110. Those elongated pieces typically have a generally square cross section. In the cutting step 110, the cutting process may give smooth surfaces, crinkle-cut surfaces, or concertina cut surfaces since the process of this invention yields improved microwave reconstitution for any surface configuration. Nevertheless, the preferred surface configuration for the cutting step 100 is a crinkle-cut with the deeper grooves for each longitudinal surface of the potato piece. The knives used for the crinkle-cutting step are selected and designed such that the knives cut grooves with a depth of about 0.08 to 0.110 inch, i.e., about 50% deeper than conventional crinkle-cut potato pieces. As a result, the volume of the core may be less than about 50% of the volume for the potato piece.

The potato pieces are then processed, 120, until the resulting pieces have a 40% to 45% total solid content, preferably about 42.5%. This characteristic of the potato piece is sharply contrasted to, and about 33% greater than, the nominal solid content of conventional potato pieces, which is about 31%. These solid content values are weight percentages and are preferably determined using standard chemical analysis techniques—specifically the AOAC vacuum oven method.

The step of processing the potato pieces to about 42.5% total solids 120 involves several intermediate steps. In particular, the cut potato pieces are blanched 122 following standard conventional processing procedures. The blanched potato pieces are dried 124 to effect a weight loss of 10-15% by weight. Preferably the drying step occurs in a forced air dryer at a temperature in the range of 100° to 180° F.

After drying, the potato pieces are parfried 124 in hot oil until the total solids are concentrated to the range of 27% to 30% total solids. Preferably, the oil temperature lies in the range of 330° to 360° F. Following that parfry step 124, the potato pieces are equilibrated 128 at ambient temperature for a period of 30 to 60 seconds.

Then, the equilibrated potato pieces are subjected to a second parfry step 129. In the second parfry step 129, the total solid content of the potato pieces is concentrated to 40 to 45%, preferably about 42.5%. The second parfry step 129 is also conducted using hot oil, but at a higher temperature than that of the first parfry step. Specifically, the second parfry step 129 uses oil at 375° to 395° F.

After processing to the 40% to 45% total solid content, the potato pieces are frozen in a conventional manner 130. For example, a spiral freezer or any other conventional freezing apparatus may be used.

Next, the frozen potato pieces are coated with oil, 140. To effect the oil coating, the potato pieces are conveyed through a drum with fins that tumble 142 the potato pieces. As the potato pieces are tumbling, soybean oil is sprayed 144 onto the surface of the potato pieces so that the oil constitutes about 1% by weight of the potato piece. The oil is preferably applied to the entire surface area of each potato piece. To be suitable for subsequent processing steps, the oil must be liquid at temperatures of 50° F. or more and must become solid at 32° F. Oil which solidifies at higher temperatures solidifies too quickly on the frozen potato pieces.

Then, the potato pieces are coated with salt 150 so that the salt represents 0.80% to 1.5% by weight of the potato piece, preferably about 1.25%. The quantity of salt on the potato pieces is determined using a Corning Chloride meter and the Corning Analytical Method. Encapsulated salt is used. The soybean oil coating functions as a tacking agent for the encapsulated salt and the oil must remain tacky long enough that the salt can adhere before the oil solidifies. It has been determined that salt brine and regular salt cannot be substituted for encapsulated salt in this invention. In particular, salt brine has been found to pull water out of the potato pieces. Similarly, regular salt pulls water out of the potato pieces. Encapsulated salt, on the other hand, does not act to pull water out of the potato pieces. Furthermore, since salt is a dielectric, and since encapsulation causes the salt to retain its crystalline form, during the microwave reconstitution of these potato pieces, the dielectric character of salt causes it to heat the surface of the potato pieces and make it crisp. As a result, the combination of oil and encapsulated salt improves the tender crispness of the resulting product.

When the potato pieces have been coated with encapsulated salt, the potato pieces are packaged, 160, and transferred to freezers for storage 170.

The carton used for the product is also a part of the invention. More particularly, the preferred package comprises the carton filled with a foodstuff and is sized to fit in conventional microwave ovens having a turntable. The preferred foodstuff here comprises microwavable crinkle-cut French fry potato pieces prepared as described above. Package depth is selected such that the package will stand on its side on a typical freezer shelf in an upright freezer case of a grocery store. In addition, the package depth must be sufficient that it can be easily filled and sealed using mechanical carton-forming equipment. Based upon those considerations, it has been found that a suitable carton is 7.25 inch square by 1.25 inch high.

Figure 6:
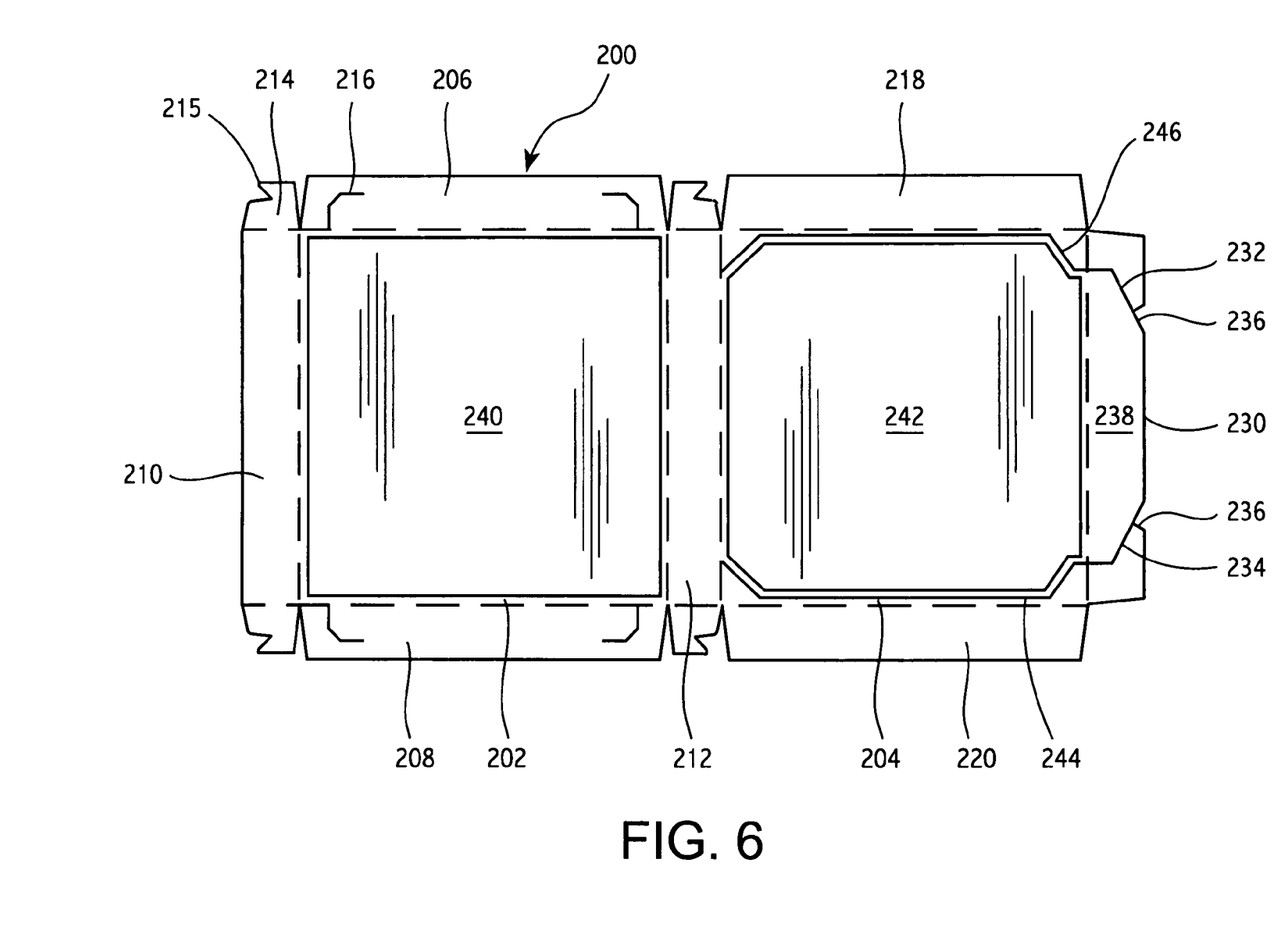
FIG. 6 is a plan view of a carton blank prior to forming, according to this invention.

Turning now to FIG. 6, the preferred package includes a carton fabricated from a paperboard blank 200. The paperboard itself may be 18 point (0.018 inch) solid bleached sulfate (SBS) paperboard having 48 guage (0.00048 inch) metalized oriented polyester (OPET) adhesive laminated to the interior surface and being clay coated on the outside surfaces to enhance printability. The carton blank 200 includes two major surfaces 202, 204 which are generally square, the surface 202 eventually becomes the bottom of the carton while the surface 204 eventually becomes the top of the carton.

Integrally attached to two side edges of the first major surface 202 are a pair of inner side panels 206, 208. A locking slot 216 is provided at each end of each inner side panel 206, 208. Integrally attached to the other two side edges of the first major surface 202 are an inner front panel 210 and a back panel 212. Each end of both the inner front panel 210 and the back panel 212 includes a laterally extending locking tab 214 having a hook 215 designed to cooperate with the slot 216 of the adjacent inner side panel 206, 208. The locking tab 214, the hook 215, and the slot 216 comprise a mechanical attachment means operable to hold the adjacent panels together. Cooperation between the hook 215 and the associated slot 216 helps establish a rigid corner for the resulting carton.

The second major surface 204 of the blank 200 is integrally connected along one side to the back panel 212 so that the two major surfaces 202, 204 are aligned with one another. Integrally attached to parallel sides of the second major panel 204 are a pair of outer side panels 218, 220. Each outer side panel 218, 200 is longitudinally aligned with a corresponding one of the inner side panels 206, 208. Integrally attached to the remaining side of the second major surface 204 is an outer front panel 230. That front panel 230 is scored at 232, 234 to define a lifting tab 238. Moreover, the front panel 230 is notched 236 at two places to provide easy access to the lifting tab 238 for removal. Suitable conventional scoring and creasing is used to define folds (shown as broken lines) in the blank 200 so that carton forming machinery can form an open tray and, when the tray is filled with potato pieces, close and seal the top.

The inner surface of the blank 200 also includes two microwave susceptor surfaces 240, 242. The first susceptor surface 240 is attached to the first major surface 202 and is square, with dimensions sufficient to substantially cover the first major surface 202 while leaving a space of about ⅛ inch between the perimeter of the first susceptor surface 240 and the perimeter of the first major surface 202. To properly heat the potato pieces, the first susceptor surface 240 should be substantially coextensive with the first major surface 202. While a ⅛ inch distance between the respective perimeters meets the condition of substantial coextensivity, distances greater than ⅛ inch can also be accommodated as long as the products to be heated will have substantial surface contact with the susceptor material.

The second susceptor surface 242 is attached to the second major surface 204 and is generally square but includes chamfered corners. The perimeter of the second susceptor surface 242 is configured and sized to be slightly inside the score line 244, 246 along which the inside of the second major panel 204 can be opened. Again, a distance of about ⅛ inch from that score line, and from the hinge line with the back panel 212 provides substantial coextensivity between the second susceptor surface 242 and a removable portion of the second major surface 204.

To assemble the package, the inner side panels 206, 208, the inner front panel 210, and the rear panel 212 are folded relative to the first major surface 202 so that the first susceptor surface 240 is located at the bottom. The projections 215 are attached to the respective slots 216 so that a self supporting tray is formed with an integral lid. The carton is then filled with a predetermined weight of product. In the case of this invention the preferred product is potato pieces, and in particular, crinkle-cut French fried potato pieces having the deep grooves described above. One advantage of the open tray of the carton here is that the potato pieces can be deposited randomly into the tray. With the depth of the tray being on the order of 1.25 inches, when the potato pieces are deposited some can be on top of others without adversely affecting the ability to close the carton to form the package.

Figure 7:
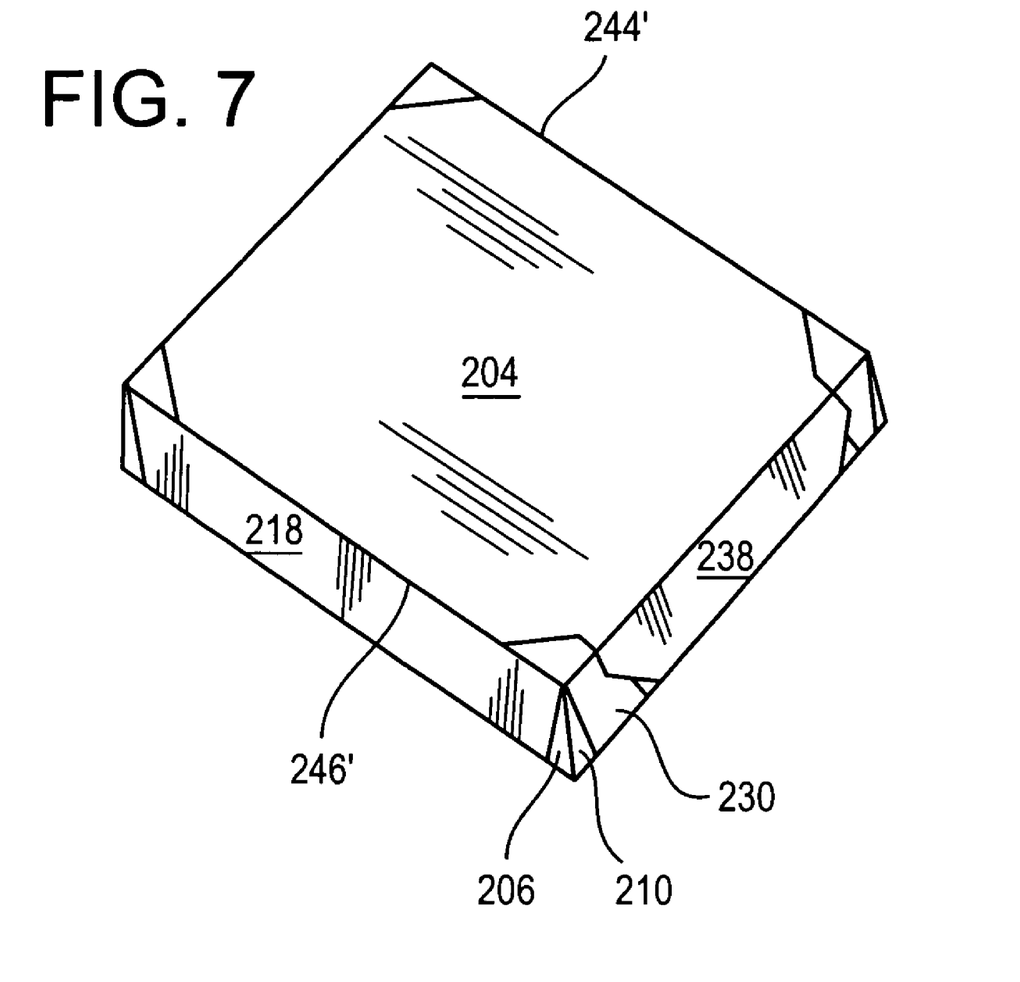
FIG. 7 is an isometric view of a completed package according to this invention.

The filled package is subsequently closed and sealed. In particular, the second major surface 204 is folded along the hinge formed between it and the rear panel 212 into position overlying the tray. Thereafter, the outer side panels 218, 220 are sealed to the corresponding inner side panels 206, 208 and the outer front panel 230 is sealed to the inner front panel 210. The completed package is illustrated in FIG. 7.

It should be noted that the completed package has score lines 246', 244' extending from the notches on the outer front panel 230 around the lifting tab 238, along edges between the second major surface 204 and the outer side panels 218, 220 (not visible), such that a generally triangular gusset is defined at each corner of the carton on the top surface of the carton. Moreover, in the preferred arrangement, the score lines 244, 246 (see FIG. 6) on the inside of the second major surface 204, are laterally offset from the score lines 244' 246'(see FIG. 7) on the outside of the second major surface 204. That offset allows deep, substantially continuous score lines to be used on both sides of the surface 204 while maintaining a seal for the product. During opening, the paper board fails between the offset score lines to leave thinner, flexible edges on the top 204.

To prepare the package for reconstitution of the product, the consumer must lift the top from the carton. To do so, the lifting tab 238 is pulled out and up. The notches 236 facilitate this step. Next, the second major surface 204 is peeled back along the score lines 246', 244' so that a gusset 250, 252, 254, 256 remains at each corner. (See FIG. 8). These gussets stiffen the corners of the remaining tray and help keep the side walls stiff. Furthermore, the gussets help keep the carton sides from springing outwardly during microwave reconstitution. Then the second major surface 204 is separated from the rear panel 212 along the hinge line there between.

Figure 8:
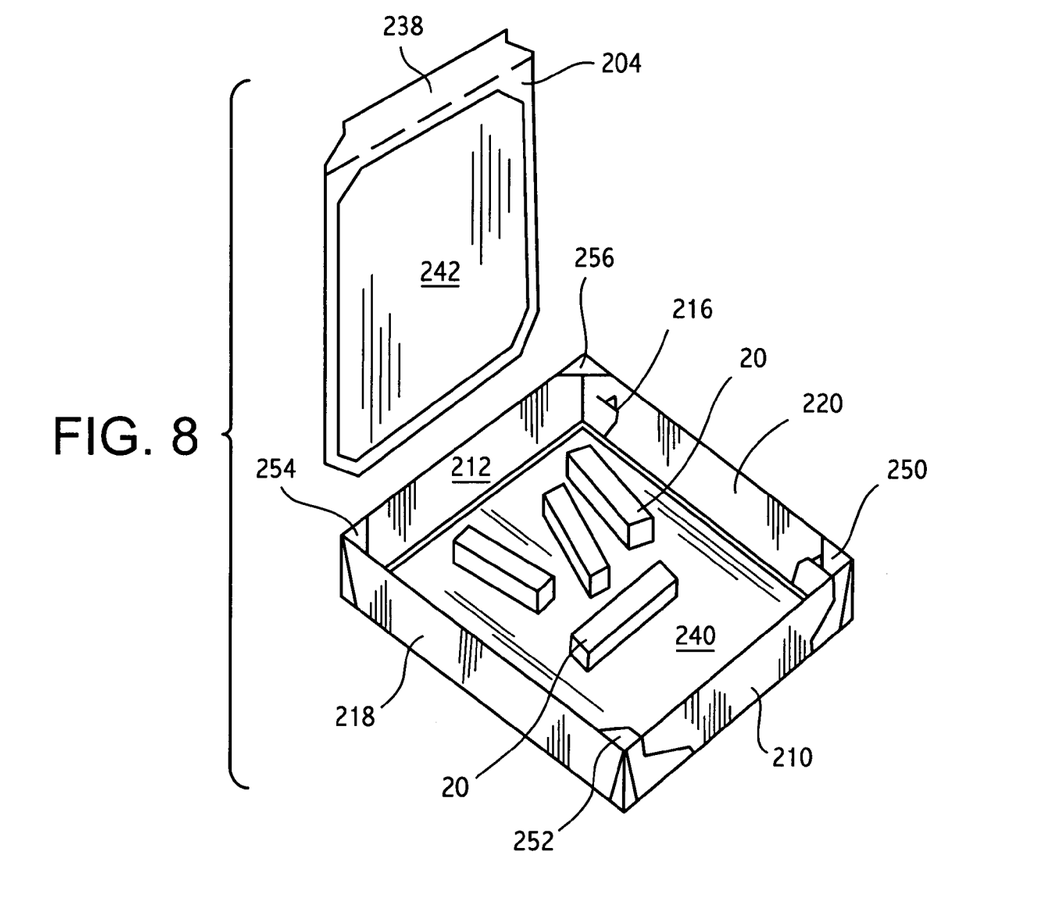
FIG. 8 is an isometric view of an opened package according to this invention.

The product is then arranged by the consumer in the tray so that a single layer of product rests on the first susceptor surface 240. The single layer of product has a substantially uniform depth which is considerably less than the depth of the tray.

Figure 9:
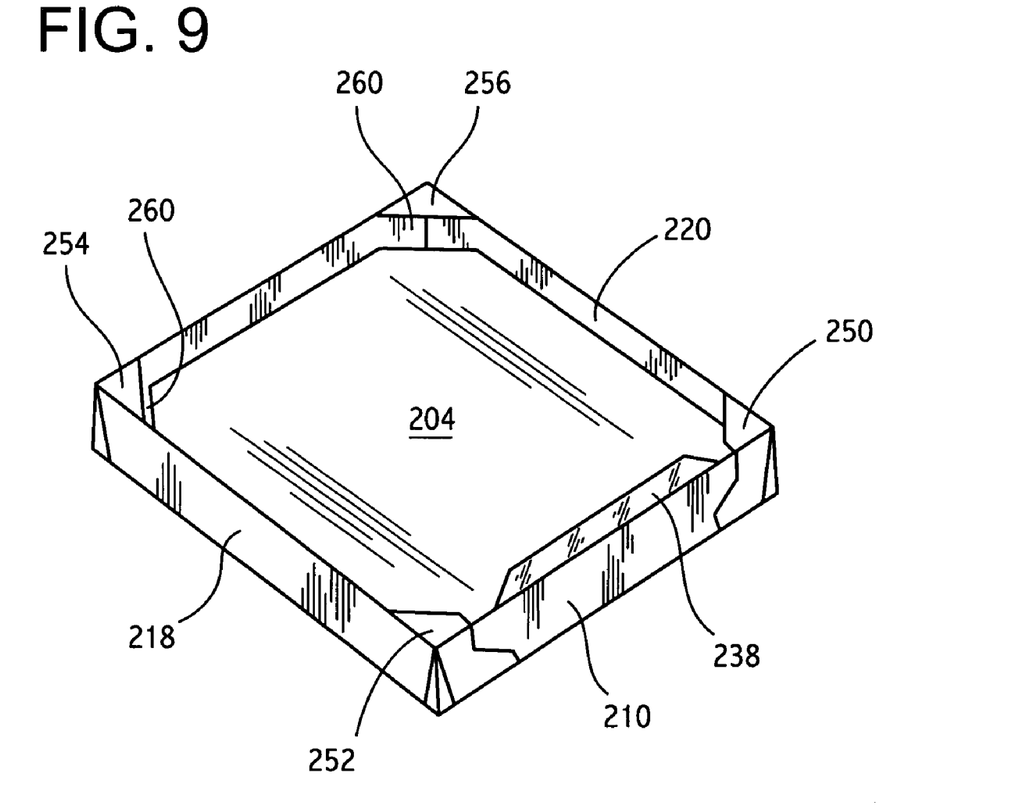
FIG. 9 is an isometric view of an opened package according to this invention prepared for microwave heating.

Next, see FIG. 9, the consumer replaces the upper major surface 204 on top of the tray such that the second susceptor surface faces the product. The top is then pressed down into the tray until the second susceptor surface contacts the product. That is, the product is sandwiched between the two susceptor surfaces and has contact with both surfaces. The first major surface 205 is frictionally held in position contacting the product by the sides of the carton. In addition, a generally triangular vent opening 260 is defined at each corner of the lid, between the lid and the adjacent walls.

Reconstitution 180 of the frozen potato pieces, prepared in accord with this invention, is accomplished by placing the package of FIG. 9, in a microwave oven. During microwave heating, steam is generally trapped inside the package until it reaches the generally triangular vent openings 260 at the corners. By virtue of contact with the microwave susceptor surfaces, the individual potato pieces are browned and rendered crispy on the exterior, while the steam heats the interior and keeps the interior moist. Without the gussets, the carton sides are free to spring out, thereby allowing the top, i.e., the second major surface 204, to be lifted up off the fries. If the top is spaced above the potato pieces by a distance exceeding about 5 mm, the product is not properly crisped by the upper susceptor surface. The length of time required for microwave reconstitution depends on the foodstuff in the package and the amount of that foodstuff which is present. By way of example, where the foodstuff in the package comprises crinkle-cut microwavable French fry potato pieces according to this invention, where about 4.75 ounces are present, the French fries are reconstituted when microwaved for about 4 minutes using a microwave oven rated at an output of about 1000 watts. Larger quantities require longer heating times while smaller quantities need shorter heating times.

For access to the heated product, the consumer grasps the portion of the lifting tab 238 which extends above the inner front panel 210, lifts that tab 238 and removes the top 204 to expose the hot product. Where crinkle-cut potato pieces are used, the resulting potato pieces are comparable to restaurant prepared, oil-fried, French fried potatoes. This result is accomplished because the high solid content in the larger ridge portion of the crinkle-cut pieces causes the ridges to be well heated through contact with the susceptor surfaces.

It should now be apparent to those skilled in the art that this invention has describes a new microwavable French fried potato product, an improved package for microwave reconstitution of frozen French fried potato products, an improved process for preparing those frozen French fried potato products, as well as a new method for reconstitution of those products. Nevertheless, this specification is intended to be illustrative, and not limiting, as it will be apparent to those skilled in the art that many substitutions, variations, and equivalents exist for the features which have been described. Accordingly, the full scope of this invention is defined by the appended claims including all legal equivalents to the elements and features set forth therein.

What is claimed is:

1. A method of reconstituting frozen potato pieces, comprising the steps of:
   providing a package having weakened lines defining an openable top, where the package includes a pair of spaced-apart microwave susceptor surfaces with frozen randomly-oriented potato pieces disposed therebetween; orienting the package so that the potato pieces are supported by one of the susceptor surfaces; removing the openable top to expose the frozen randomly-oriented potato pieces;
   completely detaching the openable top from the package;

arranging the frozen potato pieces in a single layer in the package;

pressing the detached openable top into the package until the other susceptor surface contacts the frozen potato pieces; and heating the package with microwave energy until the potato pieces are hot.

2. The method of claim 1, wherein the heating step includes microwave heating for about 4 minutes in a 1000 watt microwave oven.

3. The method of claim 1, wherein the pressing step includes placing the top within 5 millimeters of the frozen potato pieces.

4. The method of claim 1, further including the step of providing steam vents at corners of the package to contain steam in the package during microwave cooking while defining a preferred escape path for steam.

* * * * *